March 27, 1962
H. E. KLINGLER
3,026,907
WATER FAUCET CONSTRUCTION
Filed July 6, 1959
2 Sheets-Sheet 1
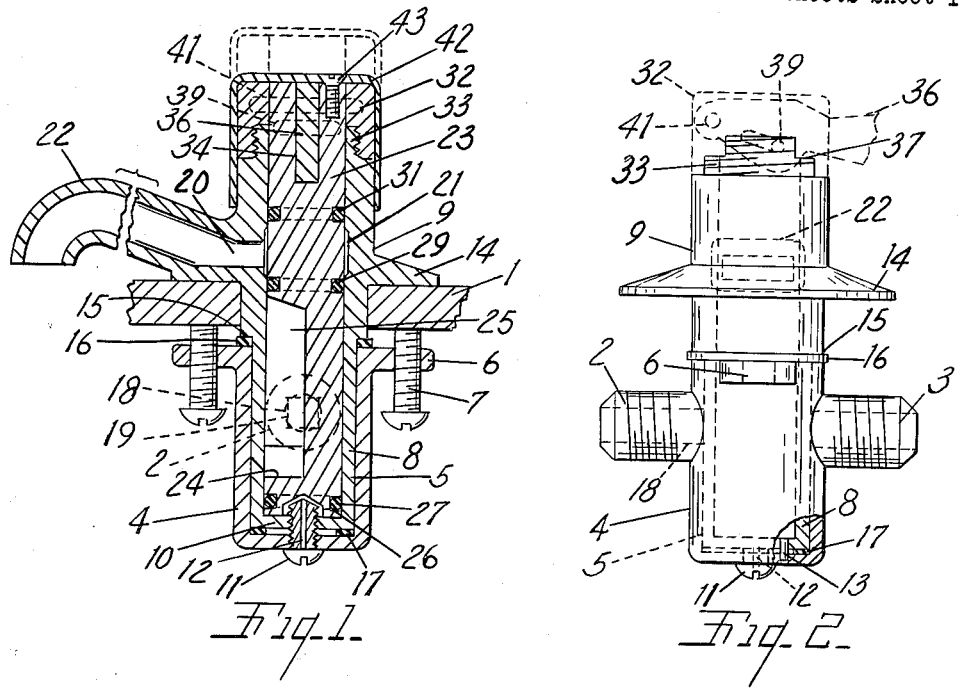
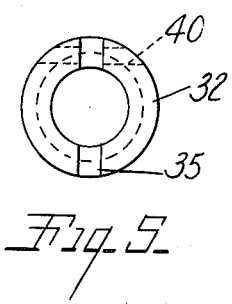
Fig. 5
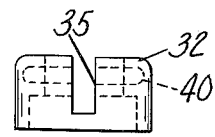
Fig. 6
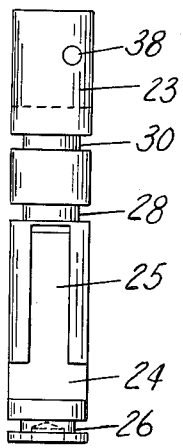
Fig. 3
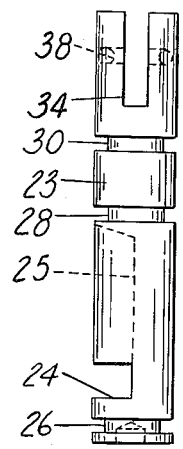
Fig. 4
INVENTOR.
Hughlin E Klingler
BY
Otto Q Earl
ATTORNEY March 27, 1962
H. E. KLINGLER
3,026,907
WATER FAUCET CONSTRUCTION
Filed July 6, 1959
2 Sheets-Sheet 2
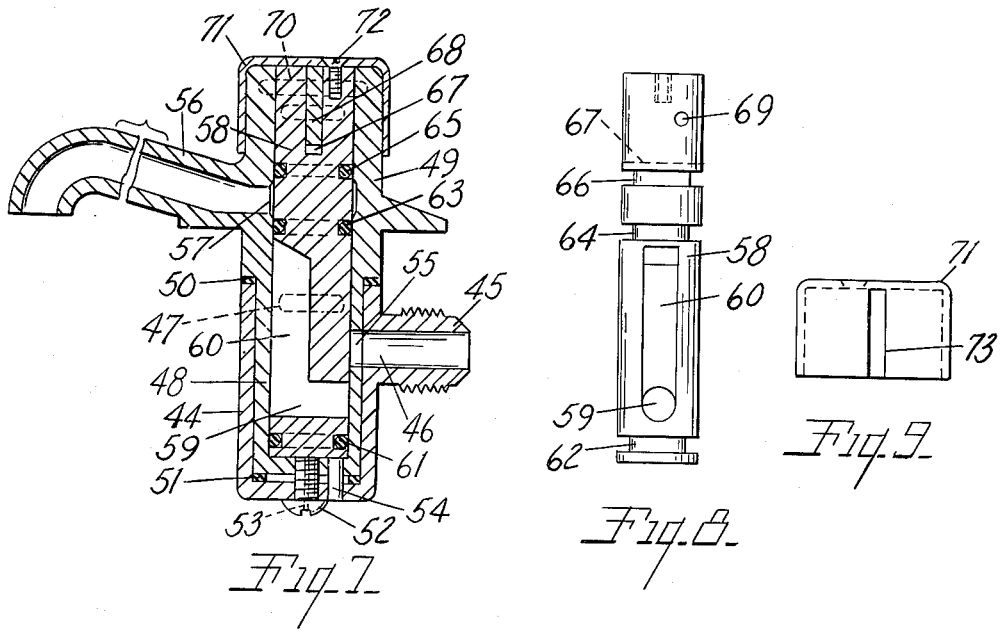
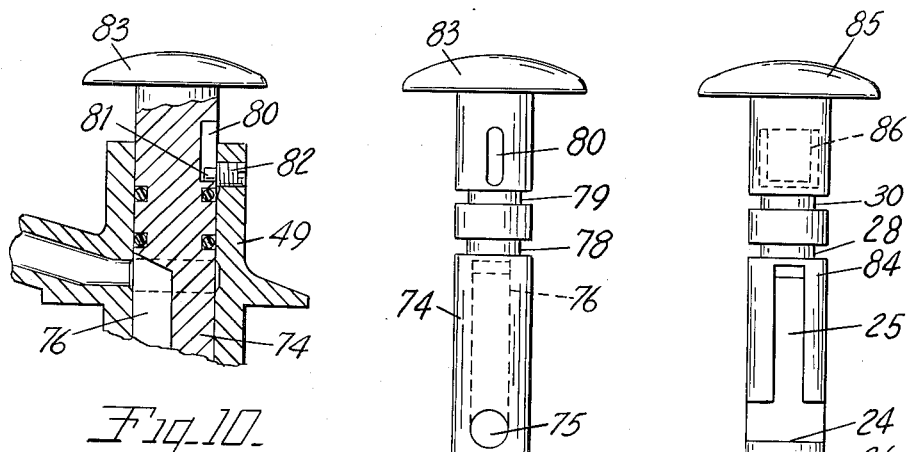
INVENTOR.
Hughlin E. Klingler
BY
ATTORNEY.

United States Patent Office 3,026,907
Patented Mar. 27, 1962

3,026,907
WATER FAUCET CONSTRUCTION
Hughlin E. Klingler, 223 Arcade Ave., Elkhart, Ind.
Filed July 6, 1959, Ser. No. 825,127
16 Claims. (Cl. 137—625.17)

This invention relates to improvements in water faucet construction. The principal objects of this invention are:

First, to provide a simplified form of faucet valve which is easily constructed, assembled and connected with a minimum of machining and expense.

Second, to provide a faucet structure in which the valve element is balanced by water pressure and providing easy opening and closing motion and in which the closure of the valve moves transversely across the flow of water to gradually close the valve without jerk and without creating water hammer in the pipes.

Third, to provide a faucet structure in which a double shutoff or seal is provided between the supply connection and the discharge spout.

Fourth, to provide a valve structure having the foregoing properties and advantages which can be manufactured for control of a single liquid or for variable control and mixing of two liquids such as hot and cold water.

Fifth, to provide a faucet structure in which the shutoff or seal is performed by an annular O-ring which is extremely long lived so as to require only very infrequent replacement and which can be replaced with a minimum of effort when necessary.

Sixth, to provide a novel form of liquid control valve structure for regulating the flow of water between supply and discharge connections that are displaced axially along the valve structure and controlled by an axially shiftable valve core sealed within the body of the valve by annular O-rings.

Other objects and advantages of the invention will be apparent from a consideration of the following description and claims. The drawings, of which there are two sheets, illustrate three highly practical forms of the faucet and valve structure and a fourth modified core element adapted for use in a fourth form of the valve.

FIG. 1 is a fragmentary vertical cross sectional view through a temperature control mixing and shutoff faucet.

FIG. 2 is an elevational view of the faucet shown in FIG. 1 taken at 90 degrees from the angle of FIG. 1 and partially broken away in cross section with the cap and operating handle shown in phantom.

FIG. 3 is an elevational view of the moveable valve core element of the valve shown in FIG. 1.

FIG. 4 is a side elevational view of the core shown in FIG. 3.

FIG. 5 is a top plan view of the handle retaining cap for the faucet shown in FIG. 1.

FIG. 6 is a projected elevational view of the cap shown in FIG. 3.

FIG. 7 is a fragmentary cross sectional view through a modified form of the faucet and valve structure adapted for on-off control of a single liquid.

FIG. 8 is an elevational view of the moveable core element of the valve shown in FIG. 7.

FIG. 9 is an elevational view of the escutcheon trim cap of the faucet shown in FIG. 7 viewed from the back side of FIG. 7.

FIG. 10 is a fragmentary cross sectional view through a third modified form of the faucet and valve structure adapted for on-off control of a single liquid.

FIG. 11 is an elevational view of the moveable valve core of the faucet shown in FIG. 10.

FIG. 12 is an elevational view of a modified valve core adapted for use in a fourth modified form of the faucet structure.

FIGS. 1 to 6 illustrate a faucet and valve structure for selectively mixing two liquids such as hot and cold water and for regulating the volume of the liquid released. The reference numeral 1 indicates a support such as the top panel of a sink or wash basin and the hot and cold supply pipes (not illustrated) are adapted to be attached to the supply nipples or connections 2 and 3 projecting laterally from opposite sides of a cup shaped lower connection fitting 4. The fitting 4 defines a cylindrical cavity 5 open at the top and can usually be formed with sufficient accuracy as part of the casting operation of the fitting. Laterally projecting ears 6 on the top of the fitting receive screws 7 for clamping the faucet to the support 1 as will be described.

Received within the cylindrical recess 5 of the supply fitting is the lower tubular end 8 of a faucet member indicated generally at 9. The tubular end 8 is sized to fit closely within the recess 5 and has a bottom wall 10 that is tapped to receive a connecting screw 11 passed through the bottom wall of the supply fitting 4. The screw 11 is centrally bored as at 12 to provide a vent passage from within the tubular faucet member to the exterior of the supply fitting 4. A dowel pin 13 (see FIG. 2) positioned eccentric to the cylindrical recess 5 holds the tubular lower end of the faucet member against rotation within the supply fitting. The faucet member 9 has a radially projecting flange 14 adapted to seat against the support 1 and the lower tubular portion 8 is provided with an exterior downwardly facing shoulder 15 positioned below the support 1. A first annular ring or seal 16 is compressed between the shoulder 15 and the top of the supply fitting 4 and a second annular seal or ring 17 is compressed between the bottom of the supply fitting 4 and the bottom of the tubular element 8 of the faucet member. A fluid tight connection is thus provided both above and below the supply connections 2 and 3 to the interior of the supply fitting 4.

The supply connections nipples 2 and 3 define ports 18 which open through the side walls of the supply fitting and the tubular end 8 of the faucet member defines registering ports 19 which are held in registry with the ports 18 by the screw 11 and the dowel pin 13.

Spaced vertically above the ports 18 and 19 and above the support 1 the faucet member 9 is provided with a laterally opening discharge port 20. Desirably the edge of the port 20 where it opens to the inner bore of the tubular faucet member is relieved as by the annular groove 21. A delivery faucet 22 is carried by the faucet member in communication with the discharge port 20 and may be either fixed as illustrated or swivelly mounted on the faucet member. Control of fluid flow between the inlet ports 18 and the discharge port 20 is effected by a cylindrical valve core or element 23 that is axially slidably and rotatably received within the tubular interior of the faucet member 9. Near its lower end the core 23 is provided with a diametrically extending transverse slot or recess 24 which in the lowered position of the core shown in FIG. 1 is located below and out of registry with the ports 19. The core 23 further defines an axially and vertically extending slot or recess 25 which opens at the bottom to the cross slot 24 and terminates at its upper end below the discharge port 20 when the core is lowered in the faucet member. It will be evident that the major portion of the periphery of the core 23 will substantially close off and seal the inlet ports 19 when the valve core is lowered but when the core is moved axially upwardly the transverse slot 24 will open progressively to the ports 19 while the upper end of the longitudinal slot opens progressively to the discharge port 20. Rotation of the core will selectively vary the opening of the two inlet ports 19 to the slot 24 to vary the proportion of the hot and cold water admitted between 100% of either hot or cold water.

In order to prevent leakage from the ports 19 through the interior of the tubular faucet member 9, the lower end of the core 23 defines an annular groove 26 receiving an O-ring seal 27 that coacts with the interior of the tubular portion 8 in all adjusted positions of the core. No water can leak past this seal to the bottom of the tubular portion 8 and the vent screw 11. Closely spaced above the upper end of the axial slot 25 is a second annular groove 26 which receives a second O-ring seal 29 that is located below the discharge port 20 and the annular groove 21 in the lowered position of the core. This O-ring 29 prevents the leakage of water upwardly to the discharge port 20. At the same time upward movement of the core 23 and the O-ring 29 will uncover the passage or slot 25 to the port 20 to deliver water when desired. In order to prevent leakage of water upwardly out of the top of the faucet when the faucet is turned on the core is provided with a third annular groove 30 receiving a third annular O-ring seal 31 that slides within the tubular faucet member in all adjusted positions of the core.

The core 23 is retained and adjusted within the tubular interior of the faucet member by a cap nut 32 rotatably threaded on the reduced threaded neck 33 on the top of the faucet member 9. The top of the core 23 is transversely slotted as at 34 and the cap 32 is correspondingly slotted as at 35 to receive the inner end of an operating lever 36. The threaded neck 33 of the faucet member is also transversely slotted providing notches 37 (see FIG. 2) the sides of which constitute lateral stops for the lever 36. The upper end of the core 23 has a transverse pin hole 38 formed therethrough for receiving the pivot pin 39 which connects the lever 36 to the core. The threaded cap 32 defines a transverse pin hole 40 which receives a second pin 41 connecting the lever 36 to the cap in offset relation to the pin 39. It will be obvious that the pin 41 forms a fixed pivot about which the lever or handle 36 can be tilted to raise or lower the core 23 by means of the connection formed by the pin 39. Limited rotation of the cap 32 on the threaded neck 33 will cause simultaneous rotation of the core 23 within the tubular faucet member 9. In order to finish off the top of the faucet an inverted cup shaped escutcheon cap 42 is secured over the threaded cap 32 by a screw 43 and moves upwardly and downwardly with the core 23.

The modified form of faucet and valve structure shown in FIGS. 7 to 9 is arranged for the on-off control of a single liquid. For this purpose the lower supply or connection fitting 44 is provided with a single threaded nipple or supply connection 45 opening laterally to its interior to the inlet port 46. The supply fitting is provided with attaching ears 47 as in the first form of the valve and is sealed around the lower tubular end 48 of the faucet member 49 by an upper seal 50 and a lower seal 51. A connecting screw 52 holds the faucet member in downwardly seated position within the supply fitting and the screw is bored or vented as at 53. A dowel pin 54 prevents rotation of the faucet member within the supply fitting.

The lower tubular end 48 of the faucet member defines a second inlet port 55 held in registry with the inlet port 46 and a spout 56 on the upper end of the faucet member which opens through the port 57 to the tubular interior of the faucet member. The cylindrical valve core element 58 is reciprocably received within the tubular faucet member 49 and defines a transverse bore or inlet passage 59 near its lower end registering with a longitudinal slot or recess 60 extending upwardly along the side of the core. The inlet passage 59 and axial passage 60 move simultaneously into and out of registering relation between the inlet port 55 and the discharge port 57. Fluid is kept from leakage around the core 58 by a lower seal ring 61 received in the groove 62 and an upper seal ring 63 received in the groove 64. A top seal ring 65 received in the groove 66 prevents leakage of water out of the top of the faucet member as in the first form of the invention.

The upper end of the core 58 is transversely slotted as at 67 to receive the end of the operating handle or lever 68 which is pinned to the core by a pin passed through the hole 69. A fixed pivot 70 for the operating lever is carried directly on the upper end of the faucet member 49 as no rotation of the core within the faucet member is needed or desired. An escutcheon trim cap 71 is secured to the upper end of the core by a screw 72 and moves upwardly and downwardly with the core over the upper end of the valve member. The cap 71 is slotted as at 73 in FIG. 9 to pass the outer end of the operating lever 68.

The modified form of valve and faucet shown in FIGS. 10 and 11 consist of a faucet member 49 which may be in all respects the same as the faucet member of the same number shown in FIG. 7 and which is connectable to the same supply or connection fitting 44. Reciprocably mounted within the cylindrical interior of the faucet member 9 is a modified valve core member 74 having a transverse inlet passage 75 formed in its lower portion and registering with an axial flow passage or recess 76 similar to the passages 59 and 60 in FIGS. 7 and 8. Sealing ring grooves 77 and 78 and 79 are provided as in other forms of the core elements and the principal difference in this core element resides in its upper end which is provided with an axially extending slot 80 which receives the guide and limit pin 81 on the end of a screw 82 threaded through the side of the faucet member 49 at the top of the faucet member. A manual grip or knob 83 on the end of the valve core permits direct manipulation and adjustment of the valve core within the limits of vertical adjustment permitted by the pin 81 in the slot 80.

The modified form of valve core shown in FIG. 12 is adapted to be installed in a faucet member of the type shown in FIGS. 1 and 2 for mixing on-off control of two liquids. For this purpose the modified core member 84 has the same transverse slot 24 and longitudinal groove 25 as the first form of the valve core and is also provided with the same seal ring grooves 26, 28 and 30. However, the upper end of the valve core 84 is provided with a manual knob or head 85 and the side of the core is provided with a rectangular recess 86. The recess 86 corresponds in function to the function of the slot 80 in FIG. 11 and coacts with a stop or limit pin in the faucet member corresponding to the pin 81 in FIG. 10. The laterally widened nature of the rectangular recess 86 permits angular turning of the core 84 for hot and cold mixing control as well as axial movement for on-off control of the faucet.

In all forms of the faucet illustrated a dual shutoff is effected in moving the intermediate seal ring downwardly below the discharge spout and in moving a vertical cylindrical surface of the core in closing relation across the inlet port of the faucet. This assures positive shutoff without jerk of the valve or water hammer in the pipes. When any of the faucets disclosed are opened the water pressure from the supply connection is balanced equally upwardly and downwardly against the valve core so that the adjustable core moves easily to any selected position and remains in that position. Leakage of liquid from the faucet is controlled at all points by deformable O-ring seals and this eliminates the necessity of extreme accurate fitting between the metal parts of the faucet and thus reduces the cost of manufacture as many of the parts can be cast to sufficiently close tolerances to operate in the faucet without machining.

What is claimed as new is:

1. A faucet valve comprising a lower connection fitting having an upright cylindrical bore with hot and cold inlet ports opening through diametrically opposite points in the wall of said bore and hot and cold supply connections on the outside of the fitting communicating with said ports, a tubular faucet member received in said bore and having second ports registering with said first ports and having an open upper end with a spout thereon projecting above said bore, opposed support engaging flanges on said fitting and said faucet member, bottom walls on said fitting and said faucet, an external shoulder on said faucet member, compressible seals positioned between said fitting and said faucet member at said shoulder and the bottom of the faucet member, a screw passed through the bottom wall of said fitting and engaged with the bottom of said faucet member to clamp said seals in sealing relation between the faucet member and said fitting, said screw defining a vent passage opening between the interior of said faucet member and the exterior of said fitting, pin means eccentric to said bore engaged between said fitting and said faucet member to prevent relative rotation thereof, a core vertically slidably and rotatably received in said faucet member and having a closely fitting cylindrical wall adapted to be moved in closing relation over both said second ports, a cross slot in the lower part of said core movable vertically with the core to register equally and to a progressively greater extent with said second ports and to be rotated with said core to selectively vary the registery with said second ports, a longitudinal slot in said core opening at its bottom to said cross slot and extending therefrom to register with said spout when said cross slot registers with said second ports, O-rings positioned sealingly around said core below said cross slot and in a spaced pair above said longitudinal slot to be located below said second ports and on opposite sides of said spout when said slots are out of registry with said ports and said spout, a slot in the top of said core having a lever pivoted therein, the upper end of said faucet member being externally threaded and longitudinally slotted to pass said lever, an internally threaded cap engaged with the thread on said faucet member and slotted to pass the outer end of said lever, a pivot pin carried by said cap eccentric to said core and passed through said lever, and an escutcheon cover fitted over the top of said cap and the adjacent end of said faucet member, said escutcheon cover having a slot in its side passing the outer end of said lever.

2. A faucet valve comprising a lower connection fitting having an upright cylindrical bore with hot and cold inlet ports opening through opposite points in the wall of said bore and hot and cold supply connections on the outside of the fitting communicating with said ports, a tubular faucet member received in said bore and having second ports registering with said first ports and having an open upper end with a spout thereon projecting above said bore, opposed support engaging flanges on said fitting and said faucet member, an external shoulder on said faucet member, compressible seals positioned between said fitting and said faucet member at said shoulder and the bottom of the faucet member, means engaged with the bottom of said faucet member to clamp said seals in sealing relation between the faucet member and said fitting, means defining a vent passage opening between the interior of said faucet member and the exterior of said fitting, means engaged between said fitting and said faucet member to prevent relative rotation thereof, a core vertically slidably and rotatably received in said faucet member and having a closely fitting cylindrical wall adapted to be moved in closing relation over both said second ports, a cross slot in the lower part of said core movable vertically with the core to register equally and to a progressively greater extent with said second ports and to be rotated with said core to selectively vary the registry with said second ports, a longitudinal slot in said core opening at its bottom to said cross slot and extending therefrom to register with said spout when said cross slot registers with said second ports, O-rings positioned sealingly around said core below said cross slot and in a spaced pair above said longitudinal slot to be located below said second ports and on opposite sides of said spout when said slots are out of registry with said ports and said spout, a slot in the top of said core having a lever pivoted therein, the upper end of said faucet member being threaded and longitudinally slotted to pass said lever, a threaded cap engaged with the thread on said faucet member and slotted to pass the outer end of said lever, and a pivot pin carried by said cap eccentric to said core and passed through said lever.

3. A faucet valve comprising a lower connection fitting having an upright cylindrical bore with hot and cold inlet ports opening through opposite points in the wall of said bore and hot and cold supply connections on the outside of the fitting communicating with said ports, a tubular faucet member received in said bore and having second ports registering with said first ports and having an upper end with a spout opening laterally therefrom projecting above said bore and open at the top, a support engaging flange on said faucet member, an external shoulder on said faucet member, compressible seals positioned between said fitting and said faucet member at said shoulder and the bottom of the faucet member, means engaged with the bottom of said faucet member to clamp said seals in sealing relation between the faucet member and said fitting, means defining and opening between the bottom of the interior of said faucet member and the exterior of said fitting, means engaged between said fitting and said faucet member to prevent relative rotation thereof, a core vertically slidably and rotatably received in said faucet member and having a closely fitting cylindrical wall adapted to be moved in closing relation over both said second ports, a cross slot in the lower part of said core movable vertically with the core to register to a progressively greater extent with said second ports and to be rotated with said core to selectively vary the registry with said second ports, a longitudinal slot in said core opening at its bottom to said cross slot and extending therefrom to register with said spout when said cross slot registers with said second ports, O-rings positioned sealingly around said core below said cross slot and in a spaced pair above said longitudinal slot to be located below said second ports and on opposite sides of said spout when said slots are out of registry with said ports and said spout, and means rotatably mounted on the top of said faucet member to rotate and reciprocate said core.

4. A faucet valve comprising a lower connection fitting having an upright cylindrical bore with hot and cold inlet ports opening through opposite points in the wall of said bore and hot and cold supply connections on the outside of the fitting communicating with said ports, a tubular faucet member received in said bore and having second ports registering with said first ports and having an upper end with a spout opening laterally therefrom projecting above said bore and open at the top, a support engaging flange on said faucet member, seals positioned between said fitting and said faucet member at the top and the bottom of said fitting, means clamping said fitting to said faucet member to clamp said seals in sealing relation between the faucet member and said fitting, means defining an opening between the bottom of the interior of said faucet member and the exterior of said fitting, means engaged between said fitting and said faucet member to prevent relative rotation thereof, a core vertically slidably and rotatably received in said faucet member and having a closely fitting cylindrical wall adapted to be moved in closing relation over both said second ports, a cross slot in the lower part of said core movable vertically with the core to register to a progressively greater extent with said second ports and to be rotated with said core to selectively vary the registry with said second ports, a longitudinal slot in said core opening at its bottom to said cross slot and extending therefrom to register with said spout when said cross slot registers with said second ports, O-rings positioned sealingly around said core below said cross slot and in a spaced pair above said longitudinal slot to be located below said second ports and on opposite sides of said spout when said slots are out of registry with said ports and said spout, and means rotatably mounted on the top of said faucet member to rotate and reciprocate said core.

5. A faucet valve comprising a lower connection fitting having an upright cylindrical bore with an inlet port opening through the wall of said bore and a supply connection on the outside of the fitting communicating with said port, a tubular faucet member received in said bore and having a second port registering with said first port and having an upper end with a spout opening laterally therefrom projecting above said bore and open at the top, a support engaging flange on said fitting, an external shoulder on said faucet member, compressible seals positioned between said fitting and said faucet member at said shoulder and the bottom of the faucet member, means clamping said fitting to said faucet member to clamp said seals in sealing relation between the faucet member and said fitting, means defining an opening between the bottom of the interior of said faucet member and the exterior of said fitting, means engaged between said fitting and said faucet member to prevent relative rotation thereof, a core vertically slidably received in said faucet member and having a closely fitting cylindrical wall adapted to be moved in closing relation over said second port, a cross slot in the lower part of said core movable vertically with the core to register to a progressively greater extent with said second port, a longitudinal slot in said core opening at its bottom to said cross slot and extending therefrom to register with said spout when said cross slot registers with said second port, O-rings positioned sealingly around said core below said cross slot and in a spaced pair above said longitudinal slot to be located below said second port and an opposite sides of said spout when said slots are out of registry with said ports and said spout, and means on the top of said faucet member for reciprocating said core.

6. A faucet valve comprising a lower connection fitting having an upright cylindrical bore with an inlet port opening through the wall of said bore and a supply connection on the outside of the fitting communicating with said port, a tubular faucet member received in said bore and having a second port registering with said first port and having an upper end with a spout opening laterally therefrom projecting above said bore and open at the top, a support engaging flange on said fitting, seals positioned between said fitting and said faucet member at the top and bottom of said fitting, means clamping said fitting to said faucet member to clamp said seals in sealing relation between the faucet member and said fitting, means defining an opening between the bottom of the interior of said faucet member and the exterior of said fitting, means engaged between said fitting and said faucet member to prevent relative rotation thereof, a core vertically slidably received in said faucet member and having a closely fitting cylindrical wall adapted to be moved in closing relation over said second port, a cross slot in the lower part of said core movable vertically with the core to register to a progressively greater extent with said second port, a longitudinal slot in said core opening at its bottom to said cross slot and extending therefrom to register with said spout when said cross slot registers with said second port, O-rings positioned sealingly around said core below said cross slot and in a spaced pair above said longitudinal slot to be located below said second port and on opposite sides of said spout when said slots are out of registry with said ports and said spout, and means on the top of said faucet member for reciprocating said core.

7. A faucet valve comprising a lower connection fitting having an upright cylindrical bore with an inlet port opening through the wall of said bore and a supply connection on the outside of the fitting communicating with said port, a tubular faucet member received in said bore and having a second port registering with said first port and having an open upper end with a spout thereon projecting laterally from above said bore, opposed support engaging flanges on said fitting and said faucet member, bottom walls on said fitting and said faucet, an external shoulder on said faucet member, compressible seals positioned between said fitting and said faucet member at said shoulder and the bottom of the faucet member, a screw passed through the bottom wall of said fitting and engaged with the bottom of said faucet member to clamp said seals in sealing relation between the faucet member and said fitting, said screw defining a vent passage opening between the interior of said faucet member and the exterior of said fitting, pin means eccentric to said bore engaged between said fitting and said faucet member to prevent relative rotation thereof, a core vertically slidably received in said faucet member and having a closely fitting cylindrical wall adapted to be moved in closing relation over said second port, a cross port in the lower part of said core movable vertically with the core to register to a progressively greater extent with said second port, a longitudinal slot in said core opening at its bottom to said cross port and extending therefrom to register with said spout when said cross port registers with said second port, O-rings positioned sealingly around said core below said cross port and in a spaced pair above said longitudinal slot to be located below said second port and on opposite sides of said spout when said cross port and longitudinal slot are out of registry with said ports and said spout, a slot in the top of said core having a lever pivoted therein, the upper end of said faucet member being longitudinally slotted to pass said lever and having a pin extending across the slot in its end and through said lever, and a cap engaged with said faucet member and slotted to pass the outer end of said lever.

8. A faucet valve comprising a lower connection fitting having an upright cylindrical bore with inlet port opening through the wall of said bore and a supply connection on the outside of the fitting communicating with said port, a tubular faucet member received in said bore and having a second port registering with said first port and having an open upper end with a spout thereon projecting laterally from above said bore, opposed support engaging flanges on said fitting and said faucet member, bottom walls on said fitting and said faucet, an external shoulder on said faucet member, compressible seals positioned between said fitting and said faucet member at said shoulder and the bottom of the faucet member, a screw passed through the bottom wall of said fitting and engaged with the bottom of said faucet member to clamp said seals in sealing relation between the faucet member and said fitting, said screw defining a vent passage opening between the interior of said faucet member and the exterior of said fitting, pin means eccentric to said bore engaged between said fitting and said faucet member to prevent relative rotation thereof, a core vertically slidably received in said faucet member and having a closely fitting cylindrical wall adapted to be moved in closing relation over said second port, a cross port in the lower part of said core movable vertically with the core to register to a progressively greater extent with said second port, a longitudinal slot in said core opening at its bottom to said cross port and extending therefrom to register with said spout when said cross port registers with said second port, O-rings positioned sealingly around said core below said cross port and in a spaced pair above said longitudinal slot to be located below said second port and on opposite sides of said spout when said cross port and longitudinal slot are out of registry with said ports and said spout, a slot in the top of said core having a lever pivoted therein, the upper end of said faucet member being longitudinally slotted to pass said lever and having a pin extending across the slot in its end and through said lever.

9. A faucet valve comprising a lower connection fitting having an upright cylindrical bore with hot and cold inlet ports opening through diametrically opposite points in the wall of said bore and hot and cold supply connections on the outside of the fitting communicating with said ports, a tubular faucet member received in said bore and having second ports registering with said first ports and having an open upper end with a spout thereon projecting laterally above said bore, opposed support engaging flanges on said fitting and said faucet member, bottom walls on said fitting and said faucet, an external shoulder on said faucet member, compressible seals positioned between said fitting and said faucet member at said shoulder and the bottom of the faucet member, a screw passed through the bottom wall of said fitting and engaged with the bottom of said faucet member to clamp said seals in sealing relation between the faucet member and said fitting, said screw defining a vent passage opening between the interior of said faucet member and the exterior of said fitting, pin means eccentric to said bore engaged between said fitting and said faucet member to prevent relative rotation thereof, and valve means movable in said faucet member to selectively open and close between said spout and said ports.

10. A faucet valve comprising a lower connection fitting having an upright cylindrical bore with an inlet port opening through the wall of said bore and a supply connection on the outside of the fitting communicating with said port, a tubular faucet member received in said bore and having a second port registering with said first port and having an open upper end with a spout thereon projecting laterally above said bore, compressible seals positioned between said fitting and said faucet member at the top and the bottom of the faucet member, means engaged with the bottom of said faucet member to hold said seals in a sealing relation between the faucet member and said fitting, means defining a vent passage opening between the bottom of the interior of said faucet member and the exterior of said fitting, means engaged between said fitting and said faucet member to prevent relative rotation thereof, and valve means movable in said faucet member to selectively open and close between said spout and said port.

11. A faucet valve comprising a lower connection fitting having an upright cylindrical bore with an inlet port opening through the wall of said bore and a supply connection on the outside of the fitting communicating with said port, a tubular faucet member received in said bore and having a second port registering with said first port and having an upper end with a spout opening laterally therefrom projecting above said bore and open at the top, a support engaging flange on said fitting, an external shoulder on said faucet member, compressible seals positioned between said fitting and said faucet member at said shoulder and the bottom of the faucet member, means clamping said fitting to said faucet member to clamp said seals in sealing relation between the faucet member and said fitting, means defining an opening between the bottom of the interior of said faucet member and the exterior of said fitting, a core vertically slidably received in said faucet member and having a closely fitting cylindrical wall adapted to be moved in closing relation over said second port, a laterally opening passage in the lower part of said core movable vertically with the core to register to a progressively greater extent with said second port, a longitudinal recess in said core opening at its bottom to said passage and extending therefrom to register with said spout when said passage registers with said second port, O-rings positioned sealingly around said core below said passage and in a spaced pair above said longitudinal recess to be located below said second port and on opposite sides of said spout when said passage and recess are out of registry with said ports and said spout, a knob on the top of said core, and a screw threaded through the wall of said faucet member and received in a recess in the exterior of said core to limit reciprocation of said core.

12. A faucet valve comprising a lower connection fitting having an upright cylindrical bore with an inlet port opening through the wall of said bore and a supply connection on the outside of the fitting communicating with said port, a tubular faucet member received in said bore and having a second port registering with said first port and having an upper end with a spout opening laterally therefrom projecting above said bore and open at the top, a support engaging flange on said fitting, seals positioned between said fitting and said faucet member at the top and the bottom of said fitting, means clamping said fitting to said faucet member to hold said seals in sealing relation between the faucet member and said fitting, means defining an opening between the bottom of the interior of said faucet member and the exterior of said fitting, a core vertically slidably received in said faucet member and having a closely fitting cylindrical wall adapted to be moved in closing relation over said second port, a laterally opening passage in the lower part of said core movable vertically with the core to register to a progressively greater extent with said second port, a longitudinal recess in said core opening at its bottom to said passage and extending therefrom to register with said spout when said passage registers with said second port, O-rings positioned sealingly around said core below said passage and in a spaced pair above said longitudinal recess to be located below said second port and on opposite sides of said spout when said passage and recess are out of registry with said ports and said spout, a knob on the top of said core, and a screw threaded through the wall of said faucet member and received in a recess in the exterior of said core to limit reciprocation of said core.

13. A faucet comprising a lower fitting having an upright tubular supply connection on the side opening laterally thereinto, a faucet member having an upright cylindrical bore formed therein with a discharge port opening from the side of the bore, the edge of said port being cut back from the surface of said bore, the lower end of said faucet member being received in laterally supported relation within said fitting and having an inlet port formed in the side thereof opening to said supply connection, vertically spaced annular seals coacting between the inside of said fitting and the outside of the lower portion of said faucet member above and below said inlet port and below said discharge port, means releasably holding said fitting and said faucet member in interfitting relation with said inlet port registering with said supply connection, the lower end of said bore in said faucet member being vented to the outside of said fitting, means for attaching said interfitted fitting and faucet member to a support with the faucet member above the support, a cylindrical valve element axially movably mounted within the bore in said faucet member, a flow passage formed in said valve member and adapted to register simultaneously at its opposite ends with said inlet port and said outlet port, vertically spaced annular seals coacting between the surfaces of said valve element and the inside of said bore and positioned on opposite side of said discharge port when said flow passage is out of registry with said ports, another annular seal coacting between the surface of said valve element and the inside of said bore below said inlet port in all adjusted positions of said valve element, and means connected to said valve element above said faucet member for vertically reciprocating the valve element.

14. A faucet comprising a lower fitting having an upright tubular supply connection on the side opening laterally thereinto, a faucet member having an upright cylindrical bore formed therein with a discharge port opening from the side of the bore, the lower end of said faucet member being received in laterally supported relation within said fitting and having an inlet port formed in the side thereof opening to said supply connection, vertically spaced annular seals coacting between the inside of said fitting and the outside of the lower portion of said faucet member above and below said inlet port and below said discharge port, means releasably holding said fitting and said faucet member in interfitting relation with said inlet port registering with said supply connection, the lower end of said bore in said faucet member being vented to the outside of said fitting, means for attaching said interfitted fitting and faucet member to a support, a cylindrical valve element axially movably mounted within the bore in said faucet member, a flow passage formed in said valve member and adapted to register simultaneously at its opposit ends with said inlet port and said outlet port, vertically spaced annular seals coacting between the surfaces of said valve element and the inside of said bore and positioned on opposite sides of said discharge port when said flow passage is out of registry with said ports, another annular seal coacting between the surface of said valve element and the inside of said bore below said inlet port in all adjusted positions of said valve element, and means connected to said valve element above said faucet member for vertically reciprocating the valve element.

15. In a valve, a cylindrical core having an operating means on one end by which the core may be moved axially and rotated, a flexible O-ring seal positioned in a groove around the other end of said core, said core having an axially extending groove formed along a portion of its periphery as a flow passage and terminating at one end in spaced relation to said O-ring, a transverse port formed through said core from said one end of said groove to the opposite side of the core, a pair of axially spaced flexible O-ring seals positioned in grooves around said core beyond the opposite end of said groove from said first ring, means forming a valve body around said core with a cylindrical core chamber in the body closely fitting said core throughout the length of the core between said first seal and the inner one of said pair of seals, said means defining axially spaced flow openings spaced to register simultaneously with said port and the opposite end of said groove from said port, said chamber being long enough to permit axial movement of said groove and said port out of registry with said openings whereby the side of the core adjacent said transverse port will close off one of said flow openings, said pair of O-rings being spaced to lie at opposite sides of one of said openings when said groove is out of registry with said one opening, and coupling means on said body forming means for connecting a supply conduit to one of said openings.

16. In a valve, a cylindrical core having an operating means on one end by which the core may be moved axially, a flexible O-ring seal positioned in a groove around the other end of said core, said core having an axially extending groove formed along a portion of its periphery as a flow passage and terminating at one end in spaced relation to said O-ring, a transverse port formed through said core from one end of said groove to the opposite side of the core, a pair of axially spaced flexible O-ring seals positioned in grooves around said core beyond the opposite end of said groove from said first ring, means forming a valve body around said core with a cylindrical core chamber in the body closely fitting said core throughout the length of the core between said first seal and the inner one of said pair of seals, said means defining axially spaced flow openings spaced to register simultaneously with said port and the opposite end of said groove from said port, said chamber being long enough to permit axial movement of said groove and said port out of registry with said openings whereby the side of the core adjacent said transverse port will close off one of said flow openings, said pair of O-rings being spaced to lie at opposite sides of one of said openings when said groove is out of registry with said one opening, and coupling means on said body forming means for connecting a supply conduit to one of said openings.

References Cited in the file of this patent
UNITED STATES PATENTS

| | | |
|---|---|---|
| 1,693,758 | Hennessey | Dec. 4, 1928 |
| 1,943,865 | Hennessey | Jan. 16, 1934 |
| 2,596,464 | Bauberger | May 13, 1952 |
| 2,684,691 | Strickler | July 27, 1954 |
| 2,800,923 | Russell | July 30, 1957 |
| 2,906,492 | Conrad | Sept. 29, 1959 |
| 2,924,243 | Cordova | Feb. 9, 1960 |

FOREIGN PATENTS

| | | |
|---|---|---|
| 658 | Great Britain | Jan. 13, 1891 |
| 337,374 | Switzerland | May 15, 1959 |